US008629954B2

(12) United States Patent
Olien et al.

(10) Patent No.: US 8,629,954 B2
(45) Date of Patent: Jan. 14, 2014

(54) GROMMET SUSPENSION COMPONENT AND SYSTEM

(75) Inventors: Neil Olien, Montreal (CA); Daniel Parker, San Francisco, CA (US); Allan Visitacion, Freemont, CA (US); Remy Pieron, Portola Valley, CA (US); Trevor Jones, Campbell, CA (US); Frank Ye, Danville, CA (US)

(73) Assignee: Immersion Corporation, San Jose, CA (US)

( * ) Notice: Subject to any disclaimer, the term of this patent is extended or adjusted under 35 U.S.C. 154(b) by 387 days.

(21) Appl. No.: 13/049,265

(22) Filed: Mar. 16, 2011

(65) Prior Publication Data

US 2011/0227849 A1    Sep. 22, 2011

Related U.S. Application Data

(60) Provisional application No. 61/315,383, filed on Mar. 18, 2010.

(51) Int. Cl.
*G06F 1/16* (2006.01)
(52) U.S. Cl.
USPC .................. 349/60; 361/679.02; 361/679.21; 361/679.3; 312/223.1; 312/223.2
(58) Field of Classification Search
USPC .......................................................... 349/60
See application file for complete search history.

(56) References Cited

U.S. PATENT DOCUMENTS

| | | | | |
|---|---|---|---|---|
| 3,128,999 A | * | 4/1964 | Schmitt | 267/153 |
| 4,556,130 A | * | 12/1985 | Puszakowski | 188/218 A |
| 5,335,893 A | * | 8/1994 | Opp | 248/635 |
| 5,419,626 A | * | 5/1995 | Crockett | 312/7.2 |
| 5,568,357 A | * | 10/1996 | Kochis et al. | 361/679.26 |
| 5,594,574 A | * | 1/1997 | Lara et al. | 349/58 |
| 5,751,551 A | * | 5/1998 | Hileman et al. | 361/753 |
| 5,765,819 A | * | 6/1998 | Hummel | 267/153 |
| 5,965,249 A | * | 10/1999 | Sutton et al. | 428/304.4 |
| 6,744,903 B1 | * | 6/2004 | Jeon | 381/388 |
| 6,822,635 B2 | | 11/2004 | Shahoian et al. | |
| 6,882,528 B2 | * | 4/2005 | Chuang | 361/679.35 |
| 7,267,313 B2 | * | 9/2007 | Krzoska et al. | 248/316.8 |
| 7,616,436 B2 | * | 11/2009 | DeMoss et al. | 361/679.34 |
| 7,633,745 B2 | * | 12/2009 | Sakakibara et al. | 361/679.11 |
| 7,835,147 B2 | * | 11/2010 | Merz et al. | 361/679.34 |
| 7,839,639 B2 | * | 11/2010 | Najbert | 361/695 |
| 8,061,673 B2 | * | 11/2011 | Yao | 248/346.04 |
| 8,068,337 B2 | * | 11/2011 | Yao et al. | 361/679.43 |
| 8,362,882 B2 | * | 1/2013 | Heubel et al. | 340/407.1 |
| 2003/0206202 A1 | | 11/2003 | Moriya | |
| 2006/0022952 A1 | | 2/2006 | Ryynanen | |
| 2006/0023416 A1 | * | 2/2006 | Chen | 361/685 |

(Continued)

FOREIGN PATENT DOCUMENTS

| | | |
|---|---|---|
| DE | 200 19 074 U1 | 2/2001 |
| EP | 1 691 263 A1 | 8/2006 |
| WO | 2004/081776 A1 | 9/2004 |

*Primary Examiner* — Anthony Q Edwards
(74) *Attorney, Agent, or Firm* — Medler Ferro PLLC

(57) ABSTRACT

A compliant grommet-based suspension system is disclosed for use in mounting an electronic touch screen or touch surface. The grommets may be designed to provide more or less movement in any direction, i.e., along the x-axis, the y-axis, and/or the z-axis, depending on the suspension application in which they are implemented.

18 Claims, 7 Drawing Sheets

(56) References Cited

U.S. PATENT DOCUMENTS

| | | |
|---|---|---|
| 2006/0181517 A1 | 8/2006 | Zadesky et al. |
| 2008/0055277 A1 | 3/2008 | Takenaka et al. |
| 2008/0060856 A1 | 3/2008 | Shahoian et al. |
| 2008/0111788 A1 | 5/2008 | Rosenberg et al. |
| 2009/0015549 A1* | 1/2009 | Gelfond et al. ............... 345/156 |
| 2010/0172080 A1* | 7/2010 | Bestle ..................... 361/679.21 |
| 2010/0245254 A1 | 9/2010 | Olien et al. |
| 2011/0164365 A1* | 7/2011 | McClure et al. ........... 361/679.3 |
| 2013/0044049 A1* | 2/2013 | Biggs et al. .................. 345/156 |
| 2013/0100607 A1* | 4/2013 | Ternus et al. ............ 361/679.55 |

* cited by examiner

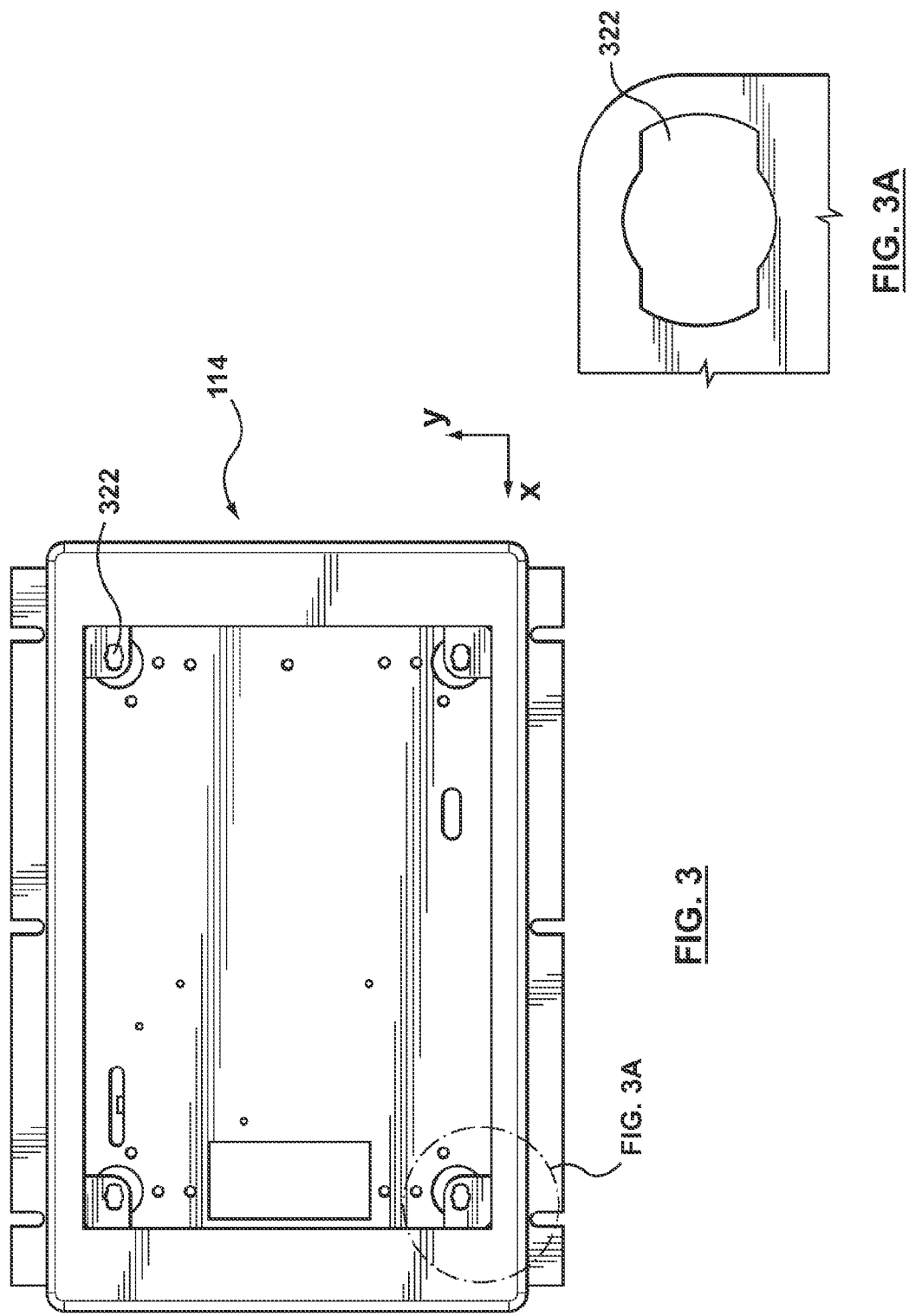

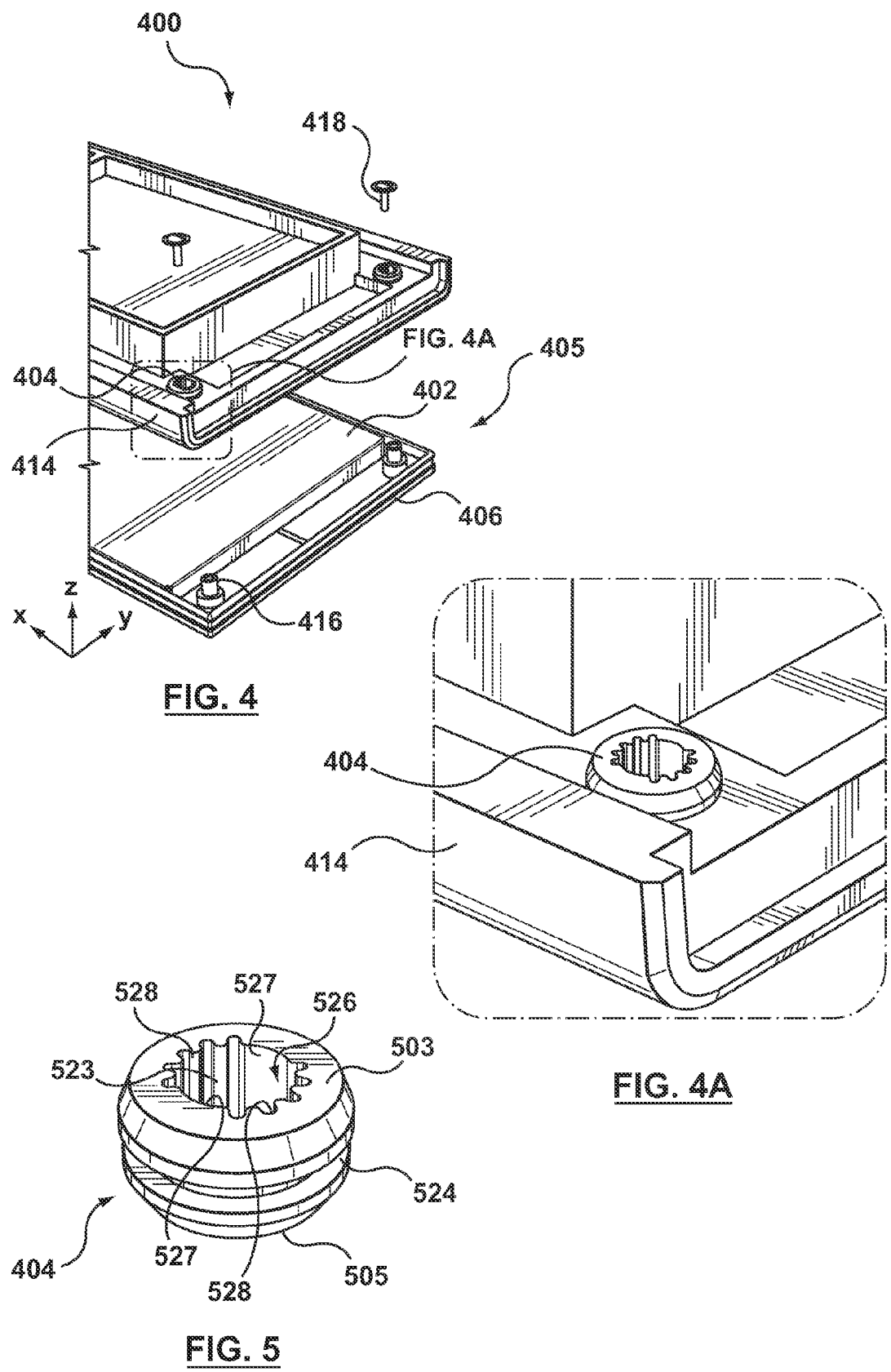

GROMMET SUSPENSION COMPONENT AND SYSTEM

CROSS-REFERENCE TO RELATED APPLICATION

This application claims the benefit of U.S. Provisional Application No. 61/315,383, filed Mar. 18, 2010, which is incorporated by reference herein in its entirety

FIELD OF THE INVENTION

The present invention relates generally to touch screens and other touch surfaces, more particularly to haptic touch screens and touch surfaces mounted by a compliant suspension to a haptic device.

BACKGROUND OF THE INVENTION

New generation consumer devices increasingly rely on touch screen inputs such as virtual buttons and sliders displayed on a screen as an alternative to physical inputs. Users may interface with such devices almost exclusively by touching and/or otherwise manipulating the virtual buttons, sliders, strollers and the like on the screen with the fingers. Graphic displays on the screen provide visual feedback responsive to such manipulation. In some more recent touch screen devices, force feedback or tactile feedback, commonly known as haptic feedback, can also be provided to a user as the user's fingers interact with virtual objects on the touch screen. This is accomplished generally by moving or vibrating the screen with a haptic actuator coupled to the screen. To allow the haptic touch screen to move in response to the haptic actuator and thereby to isolate a haptic effect to the screen, haptic touch screens have been compliantly suspended within electronic devices in which they reside. It is important, however, that, even though the screen must be able to move when the haptic actuator is activated, the suspended screen must nevertheless feel to a user as if it were substantially rigidly mounted when touched. Others have addressed the problem by not using a suspension, but not using a suspension limits the mass of the system that can have haptic effects. Suspensions have been proposed, as illustrated in U.S. Pat. Appl. Pub. No. 2008/0111788 A1 to Rosenberg et al and U.S. Pat. Appl. Pub. No. 2010/0245254 A1 to Olien et al, each of which is incorporated by reference herein in its entirety, that use compliant suspension materials of, for instance, springs or foam that may not be suitable for all touch screen applications. As such a need still exists in the art for compliant suspension systems for haptic touch screens.

SUMMARY OF THE INVENTION

Embodiments hereof are directed to a compliant suspension system for a haptic device. The haptic device includes a first body and a second body mounted to the first body to be movable relative thereto by a haptic actuator. The compliant suspension system includes at least one compliant suspension element or grommet suspension component defining a central lumen for receiving a coupling means that couples the first body and the second body together. The compliant suspension element is configured to allow movement between the first body and the second body in a first direction and to limit movement between the first body and the second body in at least a second direction. In accordance with embodiments described herein, the second body may be a touch screen component having a touch screen or other touch surface.

BRIEF DESCRIPTION OF DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 3 depicts a top view of a main housing component of FIG. 1.

FIG. 3A is an enlarged view of an aperture in the main housing component as shown in FIG. 3 that corresponds to a shape of an orienting feature of the grommet suspension component of FIG. 2.

FIG. 4 depicts a bottom partially exploded perspective view of a portion of a touch screen system for providing haptic feedback in accordance with another embodiment hereof.

FIG. 4A depicts an enlarged view of a portion of FIG. 4.

FIG. 5 depicts a grommet suspension component used in the embodiment of FIG. 4 in accordance with another embodiment hereof.

DETAILED DESCRIPTION OF THE INVENTION

Specific embodiments of the present invention are now described with reference to the figures, wherein like reference numbers indicate identical or functionally similar elements. The following detailed description is merely exemplary in nature and is not intended to limit the invention or the application and uses of the invention. Although descriptions of embodiments hereof are in the context of a suspension system for an electronic touch screen, the invention may also be used in any other applications where it is deemed useful. Furthermore, there is no intention to be bound by any expressed or implied theory presented in the preceding technical field, background, brief summary or the following detailed description.

Embodiments hereof are directed to a compliant grommet suspension component for mounting touch screens and touch surfaces within a housing. The compliant grommet suspension system will be described below within the context of a touch screen wherein a graphical display is disposed behind a touch surface or touch element. It will be understood, however, that the invention is not limited to suspensions for such touch screens but is equally applicable to any haptically excited touch surface or touch element. For example, the compliant grommet suspension system might be applied to suspend the touch pad of a computer wherein the display screen is not co-located with the touch pad. It may be applied to suspend a touch element with at least one touch sensitive region or an array of touch sensitive regions that may be created by capacitive sensors, near field effect sensors, piezo sensors, or other sensor technology. The graphical element may be a display located behind or in a separate location from the touch element and updated by a host computer, or it may simply be a plastic surface with features (e.g. graphics) indicating touch sensitive regions of an associated touch element. Thus, the terms touch screen and touch screen component when used in the following detailed description and in the claims should be construed to encompass traditional touch screens as well as any touch surface or touch element and associated graphical element to which haptic effects may be applied.

Figure 1:
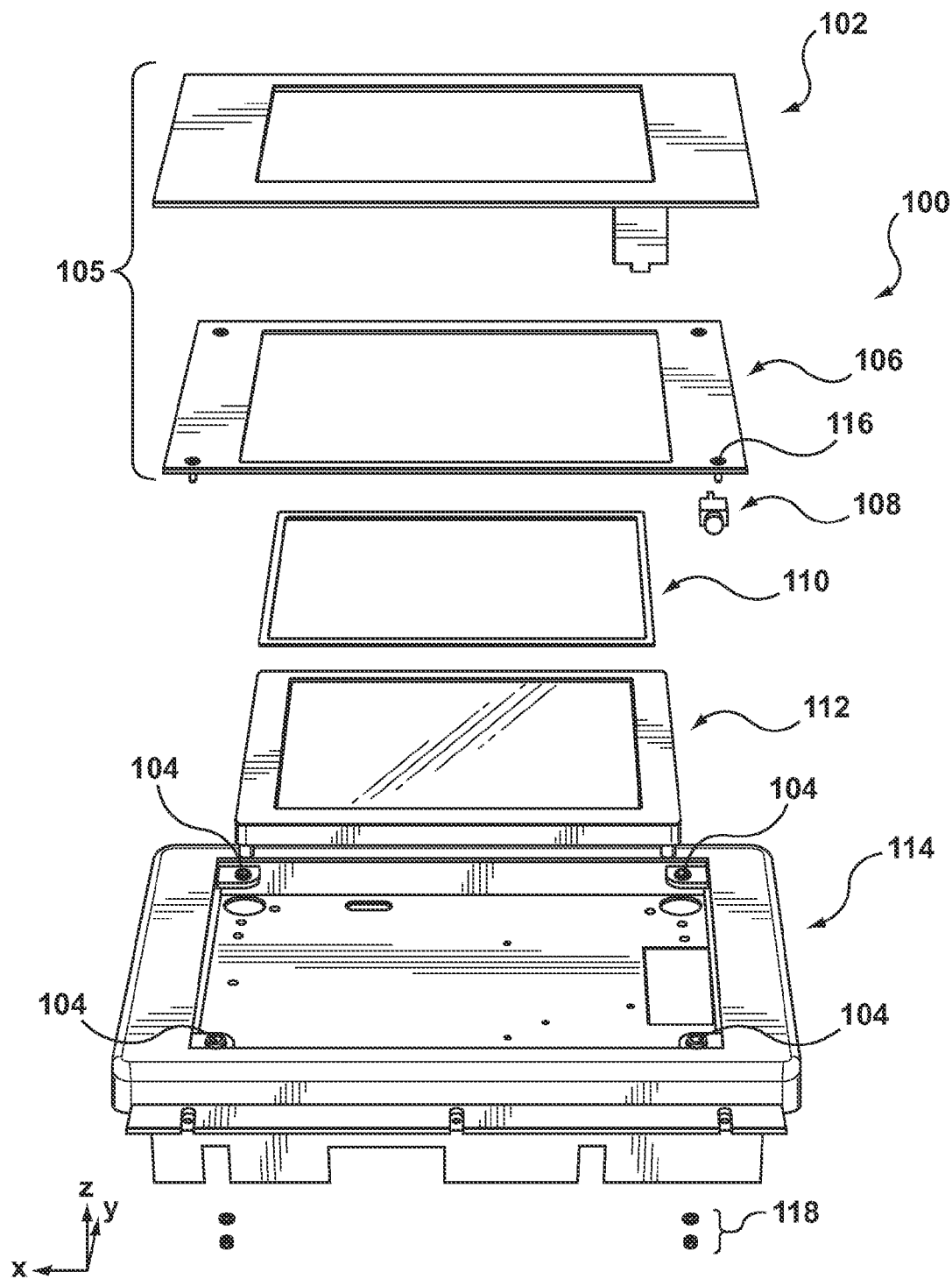
FIG. 1 is an exploded perspective view illustrating various components of a touch screen system for providing haptic feedback in accordance with an embodiment hereof.

FIG. 1 is an exploded view illustrating various components of an electronic touch screen system 100 for providing haptic feedback to a touch screen 102 that utilizes a plurality of grommet suspension components 104 in a compliant suspension system in accordance with an embodiment hereof. In an embodiment, electronic touch screen system 100 may be a medical device with a seven inch touch screen display, for instance. With reference to FIG. 1, grommet suspension components in accordance with embodiments hereof are configured to allow preferential movement of touch screen 102 in a certain direction, such as an x-direction, while limiting movement in other directions, such as the y- and z-directions. Touch screen system 100 may be any of a number of devices such as, for instance, a computer, cellular telephone, PDA, portable gaming device, media player, a printer, an office telephone, or the like. In addition to touch screen 102, touch screen system 100 includes a carrier component 106, a motor or haptic actuator 108, a dust seal 110, an LCD component 112, and a main housing component 114. Haptic actuator 108 may be any of a number of known actuator types including, without limitation, a piezo actuator, voice coil actuator, an eccentric mass actuator, an E-core type actuator, a solenoid, a moving magnet actuator, or other type of actuator as desired. Software is used to provide haptic feedback to the user of touch screen system 100. In an embodiment, touch screen 102 can display a graphical environment based on application programs and/or operating systems that are running, such as a graphical user interface (GUI). The graphical environment may include, for example, backgrounds, windows, data listings, a cursor, icons such as buttons, and other graphical objects well known in GUI environments. A user interacts with touch screen system 100 by touching various regions of touch screen 102 to activate, move, flip, advance, or otherwise manipulate the virtual graphical objects displayed on the screen, and thereby to provide inputs to the device. Such touch screens and GUIs are well known, as exemplified in U.S. Pat. Appl. Pub. No. 2008/0111788 A1 to Rosenberg et al, incorporated by reference above.

Touch screen 102 of touch screen system 100 may be considered a haptic touch screen in that it is provided with haptic actuator 108 and associated control hardware and software that provide signals to the actuator causing it to induce desired motion of touch screen 102 in coordination with the users touches. A signal may be provided to, for example, induce a jolt in conjunction with a virtual button press or collisions between virtual elements, or vibrations in conjunction with movement of virtual elements across the screen, or other types of screen movements as described in more detail in U.S. Pat. Appl. Pub. No. 2008/0111788 A1 to Rosenberg et al. incorporated by reference above. Such haptic feedback or effects, also known as tactile feedback, touch feedback, and vibro-tactile feedback, allows for a more intuitive, engaging, and natural experience for the user of touch screen system 100 and thus interaction between the user and touch screen system 100 is considerably enhanced through the tactile feedback provided by the haptic effects.

In order to provide a desired haptic effect, as previously noted above, grommet suspension components in accordance with embodiments hereof are configured to allow preferential movement of touch screen 102 in a certain direction or along a certain translational axis, such as an x-direction or axis, while limiting movement in other directions or along other translational axis, such as the y-direction or axis and z-direction or axis, when installed within touch screen system 100. FIGS. 2 and 2A-2C depict compliant grommet suspension component 104 in accordance with an embodiment hereof with FIGS. 3 and 3A depicting a top view of main housing component 114 with aperture 322. Grommet suspension component 104 has a cylindrical shape with flat upper and lower surfaces 203, 205 and a central lumen 226 that extends therebetween. Central lumen 226 is sized to receive coupling means 116 therethrough, as described in more detail below. Grommet suspension component inner surface or lumen wall 223 includes opposing channel segments 228 that are separated by arc-shaped segments 227. Grommet suspension component 104 is formed from an elastomeric material such that when installed within touch screen system 100, as described below, channel segments 228 are more readily compressible by coupling means 116 extending through central lumen 226 of grommet suspension component 104 than are arc-shaped segments 227. In various embodiments, grommet suspension components hereof are molded parts of an elastomeric material, such as without limitation silicone rubber, natural rubber and a thermoplastic elastomer (TPE), with a Durometer hardness in the range of 10 Shore A to 60 Shore A, or more particularly in the range of 20 Shore A to 40 Shore A. In an embodiment, the material used to form grommet suspension component 104 may be selected to optimize resonance during haptic feedback and minimize vibrational losses.

Figure 2C:
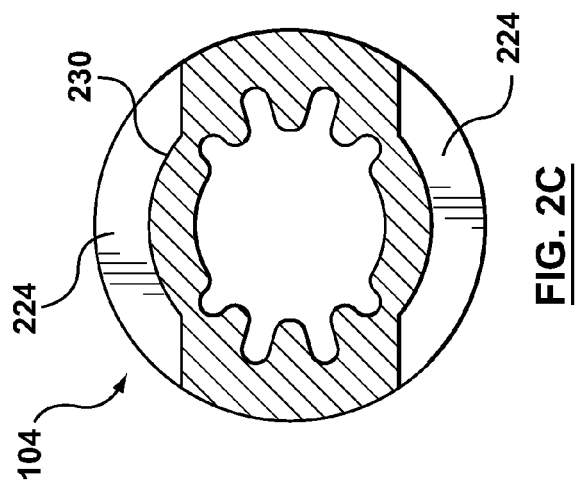
FIG. 2C is a cross-sectional view of the grommet suspension component of FIG. 2 taken along line C-C in FIG. 2B.
Figure 2A:
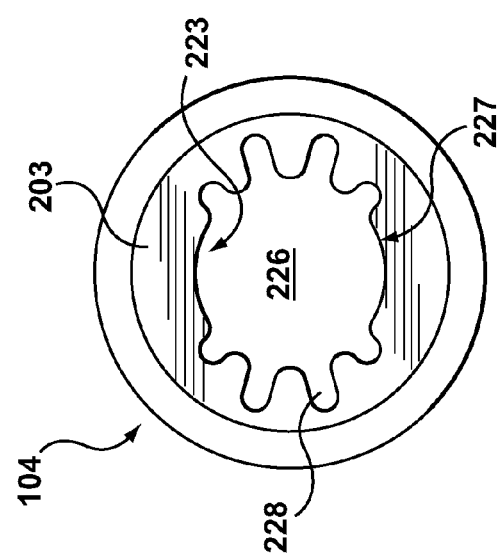
FIG. 2A is a top or bottom view of the grommet suspension component of FIG. 2.
Figure 2B:
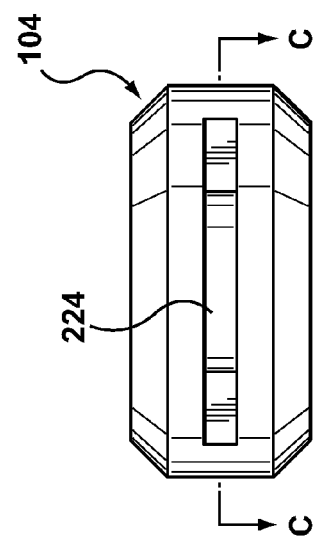
FIG. 2B is a side view of the grommet suspension component of FIG. 2.
Figure 2:
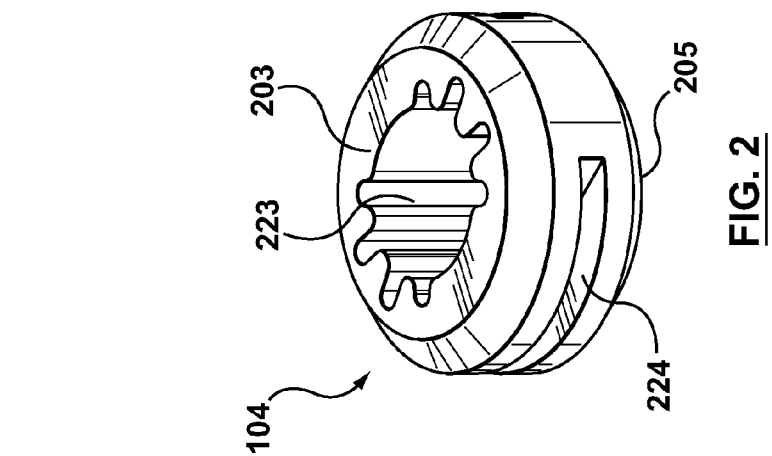
FIG. 2 depicts a grommet suspension component used in the embodiment of FIG. 1 in accordance with an embodiment hereof.

Slots 224 are formed within an outer surface of grommet suspension component 104 on either side thereof and are shaped to form an orienting or key feature 230 that is best shown in FIG. 2C. Slots 224 generally align with arc-shaped segments 227 of central lumen 226 to aid in limiting movement in the direction thereof when mounted as noted below. Orienting feature 230 assures a certain orientation of grommet suspension component 104 with respect to main housing component 114 when the grommet suspension component 104 is installed within aperture 322, which is shaped to receive orienting feature 230. More particularly, orienting feature 230 mates with aperture 322 such that opposing channel segments 228 of grommet suspension component 104 are oriented to allow greater movement of touch screen 102 along the x-axis than along the y-axis with reference to the coordinate system shown in FIGS. 1 and 3. In another embodiment, the aperture 322 may be made rotated 90° within main housing component 114 from what is shown in FIG. 3 such that when grommet suspension component 104 is positioned therein the suspension system allows greater movement of touch screen 102 along the y-axis than along the x-axis with reference to the coordinate system shown in FIGS. 1 and 3. In other embodiments, orienting features may have other shapes that permit a certain orientation of the grommet suspension component when inserted within a corresponding aperture without departing from the scope hereof.

Grommet suspension components 104 are installed within cut-outs 322 in main housing component 114, which is a non-moving component, prior to installing touch screen 102 and carrier component 106. Carrier component 106 attaches to touch screen 102 in any suitable manner and when attached together form a touch screen subassembly 105 that is subsequently attached to main housing component 114 via a plurality of coupling means 116. In the embodiment shown in FIG. 1, carrier component 106 includes four holes for receiving coupling means 116 that are utilized to secure touch screen subassembly 105 to main housing component 114 while causing a slight compression of grommet suspension component 104 therebetween. In the embodiment shown in FIGS. 1 and 2, coupling means 116 is a threaded fastener, preferably a shoulder bolt, fastened with a corresponding washer and nut 118 to thereby attach touch screen subassembly 105 to main housing component 114. In another embodiment, washer and nut 118 may be replaced by a threaded hole that is sized to receive the threaded fastener used as coupling means 116. In other embodiments, coupling means 116 may be an internally or externally threaded post made integral with carrier component 106 to extend through central lumen 226 of grommet suspension component 104 for threadably coupling with a respective screw or nut, as appropriate, to secure touch screen subassembly 105 to main housing component 114 while causing a slight compression of grommet suspension component 104 therebetween. In other embodiments, other suitable coupling means may be used as would be apparent to one of ordinary skill in the art.

With reference to the coordinate system shown in FIGS. 1 and 3, grommet suspension component 104 is shown installed to allow travel in the direction of the x-axis and to limit travel in the direction of the y-axis. More particularly, grommet suspension component 104 is installed within aperture 322 such that opposing channel segments 228 are oriented to allow greater movement of touch screen subassembly 105 along the x-axis than along the y-axis, while the compression of grommet suspension component 104 by interaction of coupling means 116 with threaded fastener 118 prevents movement in the z-direction. In other words, grommet suspension component 104 is installed within aperture 322 such that movement of touch screen subassembly 105 that forces or otherwise pushes/pulls coupling means 116 against channel segments 228 results in the compression of channel segments 228 thereby permitting movement in the x-direction, whereby movement of touch screen subassembly 105 that forces or otherwise pushes/pulls coupling means 116 against arc-shaped segments 127 results in only a slight compression of arc-shaped segments 127 thereby permitting limited movement in the y-direction. It would be understood by one of ordinary skill in the art that once grommet suspension component 104 is installed into aperture 322 as noted above the stiffer material of housing component 114 will reside within slots 224 reducing, restricting or eliminating compression of grommet suspension component 104 in the direction of each slot 224, and thereby contributing to the limitation of travel by touch screen subassembly 105 in the y-direction. It will be understood from the foregoing discussion that coupling means 116 also act as a hard stop, i.e., a physical retainer, to touch screen subassembly 105 should the moving structure of touch screen system 100 ever cause grommet suspension component 104 to reach a maximum deflection in either of the x- or y-directions. As such when mounted in the manner described above, suspension grommet components 104 reinforced by main housing component 114 and fastened by coupling means 116 allows touch screen 102 to have the required compliance for haptic feedback. Essentially the three components work together to provide a compliant suspension system that allows stiffness of the system to be altered along each translation axis, as will become clearer with reference to the embodiments described below.

LCD component 112 is also fixed to main housing component 114 in any suitable manner with dust seal 110 installed to prevent dust intrusion between touch screen 102 and LCD component 112. Haptic actuator 108 to create the haptic feedback is installed on carrier component 106, wherein grommet suspension components 104 installed as previously described allow touch screen 102 to have the required compliance for haptic feedback.

FIG. 4 is a bottom view of a portion of a touch screen system 400 implemented in a cell phone housing with FIG. 4A being an enlarged view of a portion thereof. FIG. 5 is an enlarged view of grommet suspension component 404 shown in system 400 of FIGS. 4 and 4A. Grommet suspension component 404 has a yo-yo like shape with flat upper and lower surfaces 503, 505 and a central lumen 526 that extends therebetween. Central lumen 526 is sized to receive coupling means therethrough as will be described in more detail below. Grommet suspension component inner surface or lumen wall 523 includes opposing channel segments 528 that are separated by arc-shaped segments 527. Grommet suspension component 404 is formed from an elastomeric material such that when installed within touch screen system 400, as described below, channel segments 528 are more readily compressible by coupling means 416 extending through central lumen 526 of grommet suspension component 404 than are arc-shaped segments 527. A circumferential groove 524 is formed within an outer surface of grommet suspension component 404 for installing within a cut-out or aperture of main housing component 414, as described below.

Similar to the embodiment of FIG. 1, touch screen system 400 includes main housing component 414 and touch screen subassembly 405, which is comprised of touch screen 402 and carrier component 406. As shown in FIG. 4, carrier component 406 includes integral coupling means 416 extending therefrom. Coupling means 416 are internally threaded mounting posts that are sized to extend within central lumens 526 of respective grommet suspension components 404 and to receive a threaded fastener 418. In other embodiments, alternate coupling means such as any of those mentioned above with reference to the embodiment of FIG. 1 may be used with touch screen system 400. With reference to the coordinate system shown in FIG. 4, grommet suspension component 404 is shown installed to allow travel in the direction of the x-axis and to limit travel in the direction of the y-axis. More particularly, grommet suspension component 404 is installed within its corresponding aperture such that opposing channel segments 528 of lumen wall 523 are oriented to allow greater movement of touch screen subassembly 405 along the x-axis than along the y-axis, while the compression of grommet suspension component 404 by interaction of coupling means 416 with threaded fastener 418 prevents movement in the z-direction. In other words, grommet suspension component 404 is installed within its corresponding aperture such that movement of touch screen subassembly 405 that forces or otherwise pushes/pulls coupling means 416 against channel segments 528 results in the compression of channel segments 528 thereby permitting movement in the x-direction, whereby movement of touch screen subassembly 405 that forces or otherwise pushes/pulls coupling means 416 against arc-shaped segments 527 results in only a slight compression of arc-shaped segments 527 thereby permitting limited movement in the y-direction. As similarly described with reference to the preceding embodiment, once grommet suspension component 404 is installed into its corresponding aperture, as noted above, the stiffer material of main housing component 414 will reside within slots thereof reducing, restricting or eliminating compression of grommet suspension component 404 in the direction of each slot, and thereby contributing to the limitation of travel by touch screen subassembly 405 in the y-direction. It will be understood from the foregoing discussion that coupling means 416 also act as a hard stop, i.e., a physical retainer, to touch screen subassembly 405 should the moving structure of touch screen system 400 ever cause grommet suspension component 404 to reach a maximum deflection in either of the x- or y-directions. As such when mounted in the manner described above, suspension grommet components 404 allow touch screen 402 to have the required compliance for haptic feedback.

Figure 6:
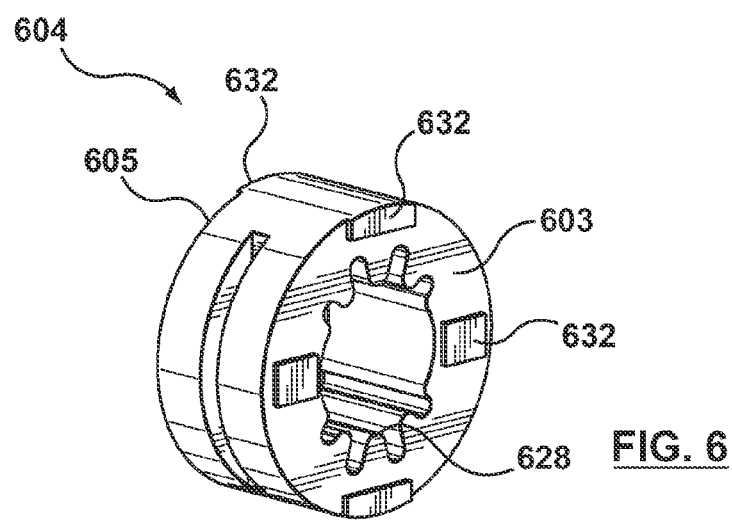
FIGS. 6-10 depict grommet suspension components in accordance with various other embodiments hereof.

FIGS. 6-10 depict grommet suspension components in accordance with various other embodiments hereof. Grommet suspension component 604 of FIG. 6 is similar in all respects to grommet suspension component 104 described above except that raised platforms 632 are circumferentially spaced on the upper and lower surfaces 603, 605 thereof. Raised platforms 632 act as spacers to space lower surface 605 from the contacting surface of a main housing or non-moving component and to space upper surface 603 from the contacting surface of a carrier or moving component. By limiting contact of grommet suspension component 604 with the contacting surfaces of the moving and non-moving components to the raised platforms 632, which thereby effectively prevents contact between the remainder of the upper and lower surfaces 603, 605, better compression of channel segments 628 of grommet suspension component 604 is possible during movement of a moving component relative to a non-moving component coupled by a suspension system in accordance herewith.

Figure 7:
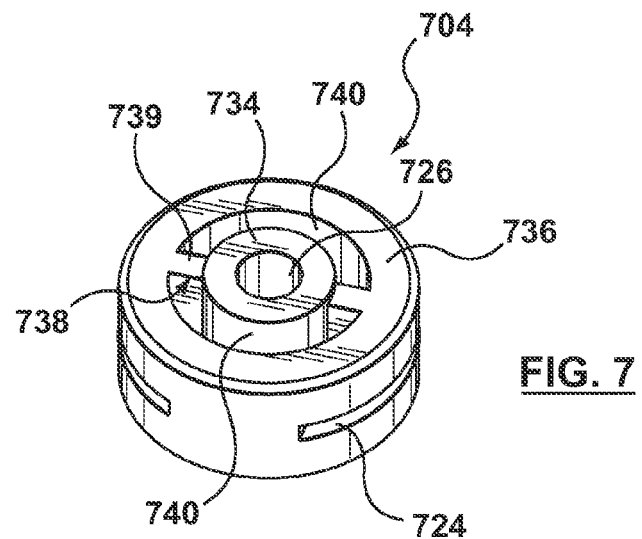

Grommet suspension component 704 of FIG. 7 includes a raised hub 734 centrally located within an outer ring 736 by wings or spokes 738. Raised hub 734 defines a central lumen 726 therethrough for receiving coupling means as discussed above. The raised hub 734 extends above an upper surface 739 of wings 738 to prevent elements coupled to hub 734 from contacting upper surface 739 and generating friction. In another embodiment, a lower surface of hub 734 may extend from a lower surface of wings 738 to prevent elements coupled to hub 734 from contacting the surface and generating friction. Wings 738 isolate motion of raised hub 734 to a single axis as the hub is able to move only within compressible or collapsible pockets or open areas 740. Slots 724 in an outer surface of grommet suspension component 704 form an orienting feature, which is similar to the one described with reference to the embodiment of FIG. 2. Slots 724 are sized and shaped to fit within a corresponding aperture of a housing or other component to limit rotation and assure a certain orientation of grommet suspension component 704 upon installation. Slots 724 generally run along the sides of grommet suspension component 704 that correspond with the attachment points of wings 738 to aid in limiting movement in that direction when installed as noted below. In an embodiment, grommet suspension component 704 is formed from an elastomeric material. In another embodiment, raised hub 734 of grommet suspension component 704 is formed from a polymeric material with the remainder of the grommet suspension component being formed of an elastomeric material. When grommet suspension component 704 is installed within a corresponding aperture of a touch screen system in accordance with embodiments hereof, movement of a touch screen subassembly that forces or pushes/pulls coupling means against hub 734 in the direction of one of pockets 740 results in the collapsing or compression of pockets 740 thereby permitting more movement in that direction, whereby movement of the touch screen subassembly that forces coupling means against hub 734 in the direction of one of wings 738, and its adjacent reinforced slot 724, results in only a slight compression or deflection of the wing 738 thereby permitting limited movement in that direction.

Figure 8:
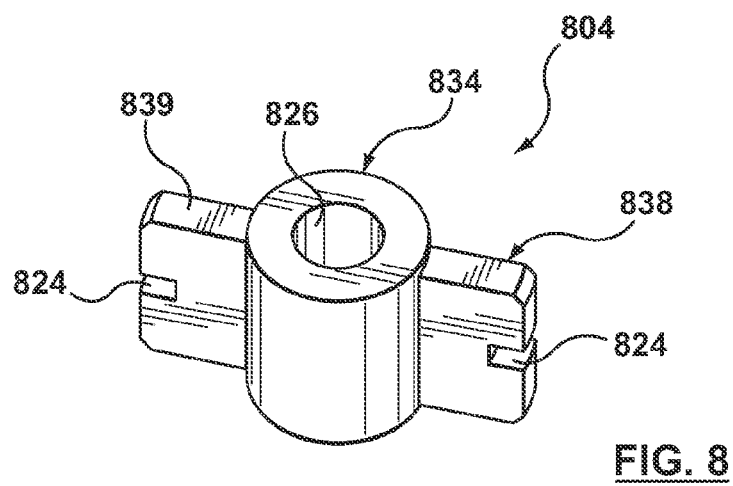

Grommet suspension component 804 of FIG. 8 includes a raised hub 834 centrally located between opposing wings or spokes 838. Raised hub 834 defines a central lumen 826 therethrough for receiving coupling means as discussed above. The raised hub 834 extends above an upper surface 839 of wings 838 to prevent elements coupled to hub 834 from contacting upper surface 839 and generating friction. In another embodiment, a tower surface of hub 834 may extend from a lower surface of wings 838 to prevent elements coupled to hub 834 from contacting the surface and generating friction. Slots 824 in an outer surface of wings 838 are sized and shaped to fit within a corresponding aperture of a housing or other component to limit rotation and assure a certain orientation of grommet suspension component 804 upon installation. Unlike in the previous embodiments, the aperture of the housing or other component is not made to correspond to an outline of grommet suspension component 804 but instead is formed to provide a compressible pocket or open area, similar to compressible pockets 740 in the embodiment of FIG. 7, within which hub 834 is free to move. Wings 838 isolate motion of raised hub 834 to a single axis as the hub is primarily able to move only within the open areas of the aperture when forced by coupling means of the system in the direction of one of the open areas as similarly described with reference to the embodiment of FIG. 7. In an embodiment, grommet suspension component 804 is formed from an elastomeric material. In another embodiment, raised hub 834 of grommet suspension component 804 is formed from a polymeric material with the remainder of the grommet suspension component being formed of elastomeric material.

Figure 9:
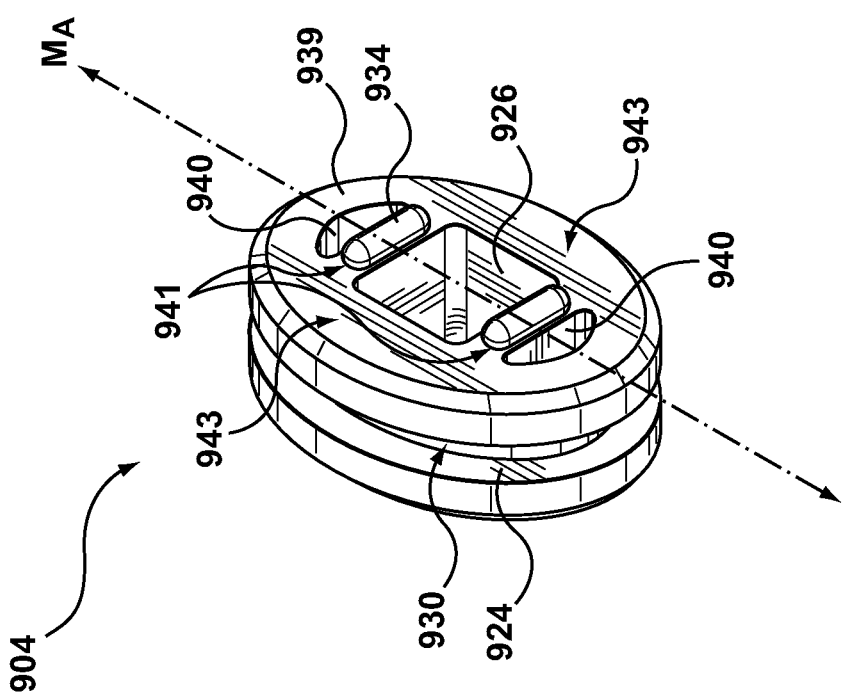

Grommet suspension component 904 of FIG. 9 has a substantially oval cross-sectional shape with a major axis $M_A$ that is parallel to a desired direction of movement for a touch screen coupled thereto. Grommet suspension component 904 defines a central lumen 926 having a substantially square cross-section and collapsible or compressible pockets 940 having substantially crescent-shaped cross-sections that are separated by thin-wall portions 941 and includes thick-wall portions 943. Central lumen 926 is sized to receive coupling means as discussed above, wherein the coupling means need not share the same cross-sectional shape as central lumen 926. Raised supports 934 located on opposing sides of central lumen 926 extend above an upper surface 939 of thin-wall portions 941 to prevent components coupled to grommet suspension component 904, such as touch screen subassembly 105, from contacting upper surface 939 of grommet suspension component 904 and generating friction. A circumferential groove or slot 924 is formed within an outer surface of grommet suspension component 904 that creates an oval-shaped orienting feature 930 for installing within a corresponding cut-out or aperture of a housing or other component, as described above, to limit rotation and assure a certain orientation of grommet suspension component 904 upon installation. As well, the portions of slots 924 that generally run along opposing sides of grommet suspension component 904 that correspond with thick-wall portions 943 aid in limiting movement in that direction when installed as noted below. In an embodiment, grommet suspension component 904 is formed from an elastomeric material. When grommet suspension component 904 is installed within a corresponding cut-out of a touch screen system in accordance with embodiments hereof, movement of a touch screen subassembly that forces coupling means positioned within central opening 926 against one of thin-wall portions 941 in a direction parallel with the major axis $M_A$ toward one of collapsible pockets 940 results in the collapsing or compression of the collapsible pocket 940 thereby permitting more movement in that direction. In addition, movement of a touch screen subassembly that forces the coupling means against one of thick-wall portions 943, and its adjacent reinforced slot 924, results in only a slight compression or deflection of grommet suspension component 904 thereby permitting limited or restricted movement in that direction.

Figure 10:
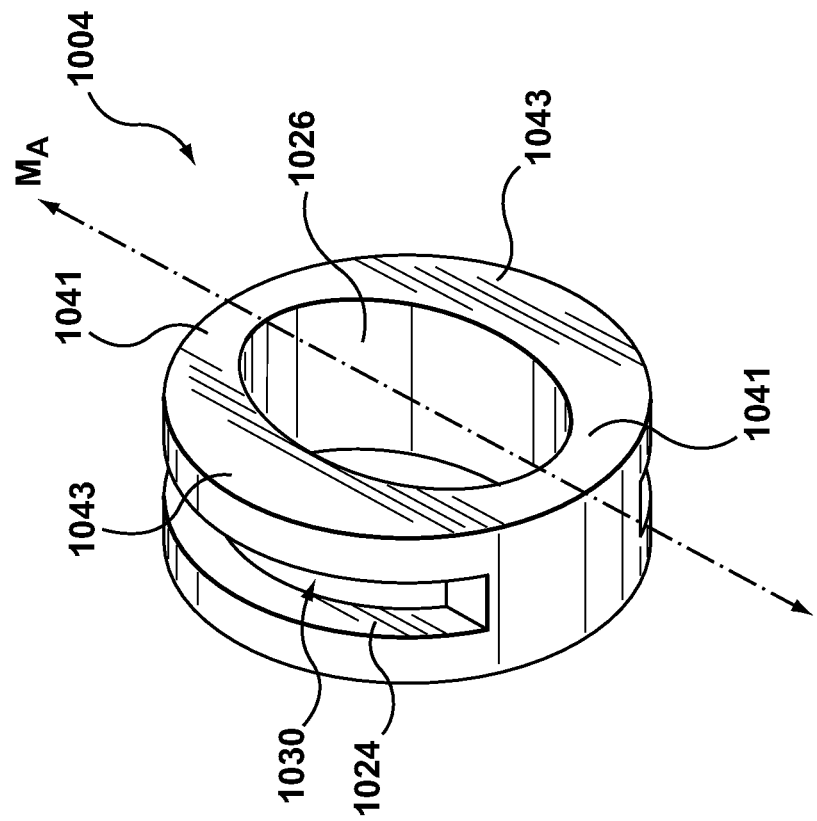

Grommet suspension component 1004 of FIG. 10 has a substantially circular cross-sectional shape and defines a central lumen 1026 having a substantially oval or elliptical cross-section with a major axis $M_A$ that is parallel to a desired direction of movement for a touch screen coupled thereto. Grommet suspension component 1004 includes thin-wall portions 1041 that lie along the major axis $M_A$ and thick-wall portions 1043 that lie along an axis perpendicular to major axis $M_A$. Central lumen 1026 is sized to receive coupling means as discussed above, wherein the coupling means need not share the same cross-sectional shape as central lumen 1026. Slots 1024 in an outer surface of grommet suspension component 1004 form an orienting feature 1030, which is similar to the one described with reference to the embodiments of FIGS. 4-7. Slots 1024 are sized and shaped to fit within a corresponding cut-out or aperture of a housing or other component to limit rotation and assure a certain orientation of grommet suspension component 1004 upon installation. Slots 1024 generally run along the sides of grommet suspension component 1004 that correspond with thick-wall portions 1043 to aid in limiting movement in that direction when installed as noted below In an embodiment, grommet suspension component 1004 is formed from an elastomeric material. When grommet suspension component 1004 is installed within a corresponding cut-out of a touch screen system in accordance with embodiments hereof, movement of a touch screen subassembly that forces coupling means positioned within central opening 1026 against one of thin-wall portions 1041 in a direction parallel with the major axis $M_A$ results in the compression of the thin-wall portion 1041 permitting more movement in that direction. In addition, movement of a touch screen subassembly that forces coupling means against one of thick-wall portions 1043, which is reinforced by a material of the housing or other component disposed within slot 1024, results in only a slight compression or deflection of the thick-wall portion 1043 permitting limited or restricted movement in that direction.

Figure 11:
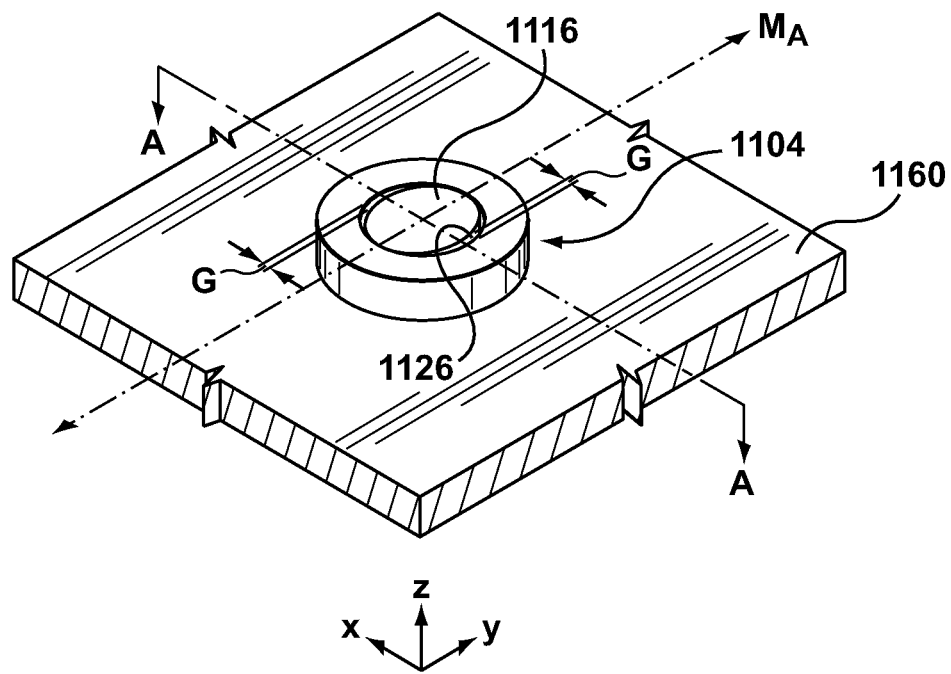
FIG. 11 is a perspective view of a grommet suspension component in accordance with another embodiment hereof, with FIG. 11A showing a cross-section of the grommet suspension component taken along line A-A of FIG. 11.
Figure 11A:
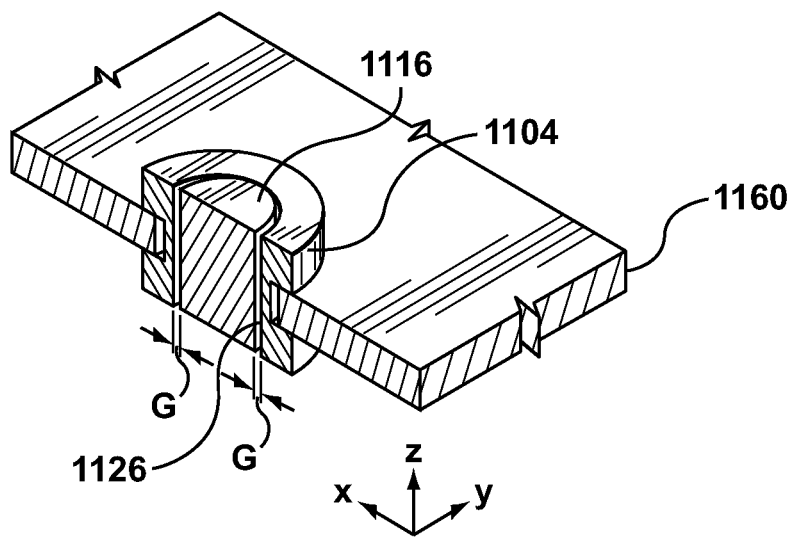

FIG. 11 is a perspective view of a grommet suspension component 1104 secured by a coupling means 1116 within a component 1160 of a touch screen system in accordance with another embodiment hereof, with FIG. 11A showing a cross-section of grommet suspension component 1104 and coupling means 1116 along line A-A of FIG. 11. In embodiments in accordance herewith, component 1160 may be one of a moving and nonmoving component of the touch screen system. Grommet suspension component 1104 has a substantially annular cross-sectional shape to define central lumen 1126 having a substantially circular cross-section. Coupling means 1116 co-axially extends through central lumen 1126 in accordance with an embodiment hereof. Coupling means 1116 has a substantially oval cross-section and is sized to fit within central lumen 1126 of grommet suspension component 1104 such that portions of the peripheral surface of coupling means 1116 that fall along its major axis $M_A$ abut with an inner circumferential surface of grommet suspension component 1104 and such that a gap G exists between coupling means 1116 and the remainder of the inner circumferential surface of grommet suspension component 1104. In embodiments hereof, coupling means 1116 may be a threaded fastener or an internally or externally threaded mounting post as previously noted in the embodiments above. When an external groove of grommet suspension component 1104 is installed within a corresponding aperture of component 1160 of the touch screen system in accordance with embodiments hereof, movement of a touch screen subassembly (not shown) in a direction perpendicular with the major axis $M_A$ of coupling means 1116, which is the x-direction as shown in FIGS. 11 and 11A, forces coupling means 1116 into one of gaps G as well as against the corresponding wall of grommet suspension component 1104 causing compression thereof when the force is great enough, thereby permitting movement of the touch screen subassembly in that direction. In addition, movement of a touch screen subassembly in a direction parallel with the major axis $M_A$ of coupling means 1116, which is the y-direction as shown in FIGS. 11 and 11A, forces coupling means 1116 against a portion of the wall of grommet suspension component 1104 that is already in contact with the periphery of coupling means 1116 causing compression of grommet suspension component 1104 and thereby permitting limited or less movement in the y-direction than in the x-direction as just described.

In another embodiment, coupling means having a circular cross-section may be used within oval-shaped lumen 1026 of grommet suspension component 1004 shown in FIG. 10 such that a gap exits therebetween along major axis $M_A$ in a direction of preferred movement. In another embodiment, coupling means having a circular cross-section may be used within square-shaped lumen 926 of grommet suspension component 904. In still another embodiment, coupling means 1116 having an oval cross-section may be used with a grommet suspension component having a central lumen with a shape similar to central lumen 226, square-shaped lumen 926 or oval-shaped lumen 1026.

In each of the preceding embodiments, the movable or floating component is described as being coupled through the central lumen of the grommet suspension component by coupling means to thereby be movably attached to the non-moving or relatively fixed component, which receives the outside groove or slots of the grommet suspension component within a corresponding cut-out or aperture therein. In other embodiments this arrangement may be reversed without departing from the scope of the present invention. For instance, any of the grommet suspension components 104, 404, 604, 704, 804, 904, 1004, 1104 may be secured within suitable corresponding cut-outs or apertures within carrier component 106, 406 or other moving component(s) of touch screen system 100, 400 with the non-moving or relatively fixed component(s) being attached to the grommet suspension component and moving component(s) of the system by coupling means.

In embodiments hereof, one or more grommet-based suspension components may be used in a mounting system for providing haptic feedback for touch screens, touch surfaces, and buttons. In accordance with embodiments hereof, grommet suspension components may be formed to have different properties in different directions. By changing the geometry, materials and mounting conditions the performance of the grommet suspension component can be designed to match the system in which it is installed. For example, the stiffness may be varied in different directions, i.e., higher in one direction and lower in another direction, to allow a touch screen to move in the direction of the desired haptic effect but be very rigid in other directions. The grommet suspension component is also easy to install in manual assembly or could be molded into the product directly eliminating an assembly step. The grommet suspension component also provides a positive mechanical retention of the moving elements of the system.

In another embodiment, a metal or plastic spring may be used in concert with the grommet suspension component to achieve a desired haptic suspension. Suspensions such as those described herein solve the problem of having the touch screen or surface move relative to the rest of the device by isolating the movement of the touch screen or surface to only the desired direction(s). The coupling means used with the grommet suspension component also aids in mechanical retention of the movable component to the non-moving component or vice versa.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A compliant suspension system for a haptic device comprising:
    a first body;
    a second body mounted to the first body to be movable relative thereto; and
    at least one compliant suspension element attached to one of the first body and the second body, the compliant suspension element defining a central lumen between an upper surface and a lower surface thereof, the central lumen being configured for receiving a coupling means therethrough that couples the first body and the second body together, the compliant suspension element being configured to allow movement between the first body and the second body in a first direction and to limit movement between the first body and the second body in at least a second direction, wherein an inner surface of the central lumen defines opposing longitudinally-extending channel segments that are compressible when acted against by the coupling means to allow movement between the first body and the second body in the first direction.

2. The compliant suspension system of claim 1, wherein the second body includes a touch screen or touch surface component.

3. The compliant suspension system of claim 1, wherein the at least one compliant suspension element is formed from an elastomeric material.

4. The compliant suspension system of claim 3, wherein the compliant suspension element includes a slot in an outer surface thereof for fitting within a corresponding aperture of the one of the first body and the second body such that at least a portion of the slot is in the second direction.

5. The compliant suspension system of claim 4, wherein when the coupling means acts against the compliant suspension element in the direction of the slot, movement of the second body relative to the first body is limited due at least in part to a stiffness of a material of the one of the first body and the second body disposed within the slot.

6. A compliant suspension system for a haptic device comprising:
    a first body;
    a second body mounted to the first body to be movable relative thereto; and
    at least one compliant suspension element attached to one of the first body and the second body, the compliant suspension element defining a central lumen between an upper surface and a lower surface thereof, the central lumen being configured for receiving a coupling means therethrough that couples the first body and the second body together, the compliant suspension element being formed from an elastomeric material and being configured to allow movement between the first body and the second body in a first direction and to limit movement between the first body and the second body in at least a second direction, wherein the coupling means is movable within a gap between the coupling means and the central lumen of the compliant suspension element to permit movement of the second body relative to the first body in the first direction.

7. The compliant suspension system of claim 6, wherein at least one of the central lumen of the compliant suspension element and the coupling means has an oval cross-section.

8. A haptic device having a compliant suspension system comprising:
    a housing component;
    a touch screen component mounted to the housing component to be movable relative thereto;
    a haptic actuator for moving the touch screen component relative to the housing component and thereby provide a haptic effect to a user of the touch screen component; and
    a grommet suspension component defining a central lumen for receiving a coupling means that couples the touch screen and housing components together, wherein in reaction to a force of the haptic actuator in one of a first and second directions the grommet suspension component is configured to allow movement of the touch screen component relative to the housing component in the first direction and to limit movement of the touch screen component relative to the housing component in at least the second direction.

9. The compliant suspension system of claim 8, wherein the touch screen component includes a touch screen or touch surface.

10. The compliant suspension system of claim 8, wherein the grommet suspension component is formed from an elastomeric material.

11. The haptic device of claim 10, wherein the grommet suspension component is seated within a corresponding aperture of the housing component and the coupling means extends through the central lumen of the grommet suspension component to secure the touch screen component to the housing component.

12. The haptic device of claim 11, wherein the force of the haptic actuator in the first direction forces the coupling means to compress at least one of a compressible segment and a collapsible pocket of the grommet suspension component thereby allowing movement of the touch screen component in the first direction.

13. The haptic device of claim 11, wherein the force of the haptic actuator in the first direction forces the coupling means into a gap in the central lumen between the coupling means and the grommet suspension component thereby allowing movement of the touch screen component in the first direction.

14. The haptic device of claim 10, wherein the grommet suspension component is seated within a corresponding aperture of the touch screen component and the coupling means extends through the central lumen of the grommet suspension component to secure the housing component to the touch screen component.

15. The haptic device of claim 14, wherein the force of the haptic actuator in the first direction forces the grommet suspension component against the coupling means to compress at least one of a compressible segment and a collapsible pocket of the grommet suspension component thereby allowing movement of the touch screen component in the first direction.

16. The haptic device of claim 14, wherein the force of the haptic actuator in the first direction forces the grommet suspension component toward the coupling means thereby eliminating or reducing a gap in the central lumen between the coupling means and the grommet suspension component to permit movement of the touch screen component in the first direction.

17. The haptic device of claim 10, wherein the grommet suspension component includes a slot in an outer surface thereof for fitting within a corresponding aperture of one of the housing component and the touch screen component such that at least a portion of the slot is in the second direction.

18. The haptic device of claim 17, wherein when the coupling means acts against the grommet suspension component in the direction of the slot, movement of the touch screen component relative to the housing component is limited due at least in part to a stiffness of a material of the one of the housing component and the touch screen component disposed within the slot.

\* \* \* \* \*